US006531791B2

United States Patent
Ekelund et al.

(10) Patent No.: US 6,531,791 B2
(45) Date of Patent: Mar. 11, 2003

(54) SYSTEM FOR POWER CONNECTION AND RECONNECTION

(75) Inventors: Folke Ekelund, Norsborg (SE); Leif Hansson, Ronninge (SE); Attila Mathe, Skarholmen (SE); Kjell Rundkvist, Lidingo (SE); Gote Johansson, Hagersten (SE)

(73) Assignee: Emerson Energy Systems AB, Stockholm (SE)

( * ) Notice: Subject to any disclaimer, the term of this patent is extended or adjusted under 35 U.S.C. 154(b) by 91 days.

(21) Appl. No.: 09/773,127

(22) Filed: Jan. 31, 2001

(65) Prior Publication Data

US 2001/0019226 A1 Sep. 6, 2001

(30) Foreign Application Priority Data

Feb. 16, 2000 (SE) ................................. 0000492

(51) Int. Cl.$^7$ ................................. H02J 9/00
(52) U.S. Cl. ............................. 307/66; 307/29; 307/82
(58) Field of Search ....................... 307/19–29, 43–87, 307/134, 135

(56) References Cited

U.S. PATENT DOCUMENTS

| | | | | |
|---|---|---|---|---|
| 4,614,877 A | * | 9/1986 | Knesewitsch et al. | 307/64 |
| 5,099,187 A | * | 3/1992 | Rippel | 307/109 |
| 5,260,605 A | | 11/1993 | Barfield | |
| 5,483,108 A | | 1/1996 | Girard et al. | |
| 5,572,395 A | * | 11/1996 | Rasums et al. | 361/18 |
| 5,619,076 A | * | 4/1997 | Layden et al. | 307/112 |
| 5,726,506 A | * | 3/1998 | Wood | 307/147 |
| 6,281,602 B1 | * | 8/2001 | Got et al. | 307/66 |
| 6,369,461 B1 | * | 4/2002 | Jungreis et al. | 307/23 |

FOREIGN PATENT DOCUMENTS

| | | |
|---|---|---|
| GB | 2 281 458 | 3/1995 |
| JP | 4-71338 | 3/1992 |

OTHER PUBLICATIONS

International–Type Search Report dated Nov. 29, 2000, 4 pages.

* cited by examiner

Primary Examiner—Fritz Fleming
(74) Attorney, Agent, or Firm—Harness, Dickey & Pierce, P.L.C.

(57) ABSTRACT

A full float system with Transient Free Multiple Load Disconnection Reconnection (TFMLDR) is disclosed. The system is based on a concept of always connecting loads and dedicated rectifiers together, and then connect such groups (1-n) via power switching devices ($C_1$–$C_n$) to a pair of busbars. A backup battery is typically connected directly to the busbars via a respective fuse ($F_1$14 $F_y$). The disconnection/reconnection of individual groups to a busbar can then be controlled such that no transients are produced in the system voltage. Such a system is advantageous for reconnection of a load after a disconnection due to a mains power failure. The loads present a substantial input capacitance assisting in stabilizing DC power supply to the load and this load is directly connected to a rectifying unit delivering voltage controlled power during normal mains power operation. After a disconnection of a load from the busbar and the battery by the power switching member, a reconnection will be done in the following order. The rectifier will deliver current controlled power, which then charges the input capacitance of the load up to a voltage level close to the voltage of the battery. Then a reconnection to the battery with limited inrush current will be achieved thereby obtaining a practically transient free reconnection to the battery.

16 Claims, 3 Drawing Sheets

STATE OF THE ART

STATE OF THE ART

SYSTEM FOR POWER CONNECTION AND RECONNECTION

TECHNICAL FIELD

The present invention relates to power systems and their backup battery power systems and more particularly to a transient free reconnection of disconnected loads after a mains power failure.

BACKGROUND

Power systems for telecommunication applications of today usually use the full float operation concept consisting of busbars to which rectifiers, batteries and loads are connected in parallel. A typical operating DC voltage level is between −40.5 and −60 volts to comply with a standard for operation of −48 volts telecommunications systems. The batteries, which normally constitute lead accumulators, are sensitive to deep discharge and must therefore be protected from such an excessive discharge. A common way of protection is to disconnect the batteries from the busbars by connection/reconnection devices (heavy duty switches) in the case of a too long lasting mains power failure. The switching member then forms a battery contactor device, which is normally referred to as a LVBD (Low Voltage Battery Disconnect) which is illustrated in FIG. 1.

In new applications it is economically beneficial to first disconnect low priority loads during mains failures. This means that a disconnecting device for each load, a LVLD (Low Voltage Load Disconnect) has to be incorporated into the power system to prevent a deep discharge of the batteries in case of such a long lasting mains power failure. A typical basic system according to the state of the art is illustrated in FIG. 2.

The existing solutions have the following disadvantages:
LVBD (FIG. 1)

When several batteries are connected to the power supplying busbars the maximum system size is given by the size of the disconnection/reconnection device since the last disconnection device normally will have to disconnect the total load current. Furthermore priority/non-priority load disconnection is not possible.
LVLD (FIG. 2)

Transients on system voltage (voltage sags produced by large inrush currents to the capacitors in the load) at reconnection of individual non-priority load to live busbars may disturb the operation of the priority loads. Lesser load power supply availability compared to the LVBD principle (failure of disconnection/reconnection device causes interruption of the power supply to the load). Stress on the disconnecting/reconnecting device since the device has to handle the total non-priority load current.

UK Patent Application GB-A-2 281 458 discloses an apparatus for managing power supply to a telecommunications base station. This disclosure is representative of the state of the art.

A further document U.S. Pat. No. 5,260,605 discloses a polarity switch which changes the direction of DC to various loads in response to a sensed loss of AC and nonessential loads are shed in response to a sensed change in DC polarity at the various loads.

Finally a Japanese document JP-04-071338 discloses a solution to increase backup time by a battery without increasing the capacity of the battery by reducing a load current in response to a decrease in output voltage even if interruption of a power source for a communication is continued.

Typically according to state of the art power systems are described wherein loads are selectively disconnected upon a power failure while maintaining a reduced DC operation by means of backup batteries and the entire load is then reconnected for full operation immediately when AC power is established again. Furthermore there are also solutions available utilizing one common rectifier similar to FIG. 2, but distributing DC from the battery to loads of different priority by means of a diode circuitry. However when operating with larger current loads the voltage drop over such diodes may often be of the order 1–1,5 volts resulting in a non-desirable high power loss besides an unwanted heavy heating of the diodes in the circuitry. Furthermore such a system can not in a simple way be expanded as the current of the priority load or loads will pass a distribution diode, which therefore will limit the priority system size.

Therefore there is still a demand for a DC power supply system, which is able to connect and disconnect loads, particularly at high DC current consumption, according to a predefined priority in connection to a mains AC power loss, without stressing the contacts of the switching means due to transients at disconnect or strong inrush currents at connect during such a switching while trying to maintain a certain level of backup battery charge.

SUMMARY

The present invention discloses a full float system with Transient Free Multiple Load Disconnection Reconnection (TFMLDR), which is based on a concept of always connecting loads and dedicated rectifiers together, and then connect such groups via power switching members to a respective busbar of a pair of busbars. The batteries will be connected directly to this busbar preferably via fuses. The disconnection/reconnection of individual groups to a busbar can then be controlled such that no transients are produced in the system voltage. Such a system is advantageous for reconnection of a load after a disconnection due to a mains power failure. The loads present a substantial input capacitance assisting in stabilizing DC power supply to the load and this load is directly connected to a rectifier delivering voltage controlled power during normal mains operation. After a disconnection of a load from the busbar and the battery by the power switching member, a reconnection will be done in the following order. The rectifier delivers current controlled power, which charges the input capacitance of the load up to a voltage level close to the voltage of the battery. Then reconnection with limited inrush current will be achieved thereby obtaining a practically transient free reconnection to the battery.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
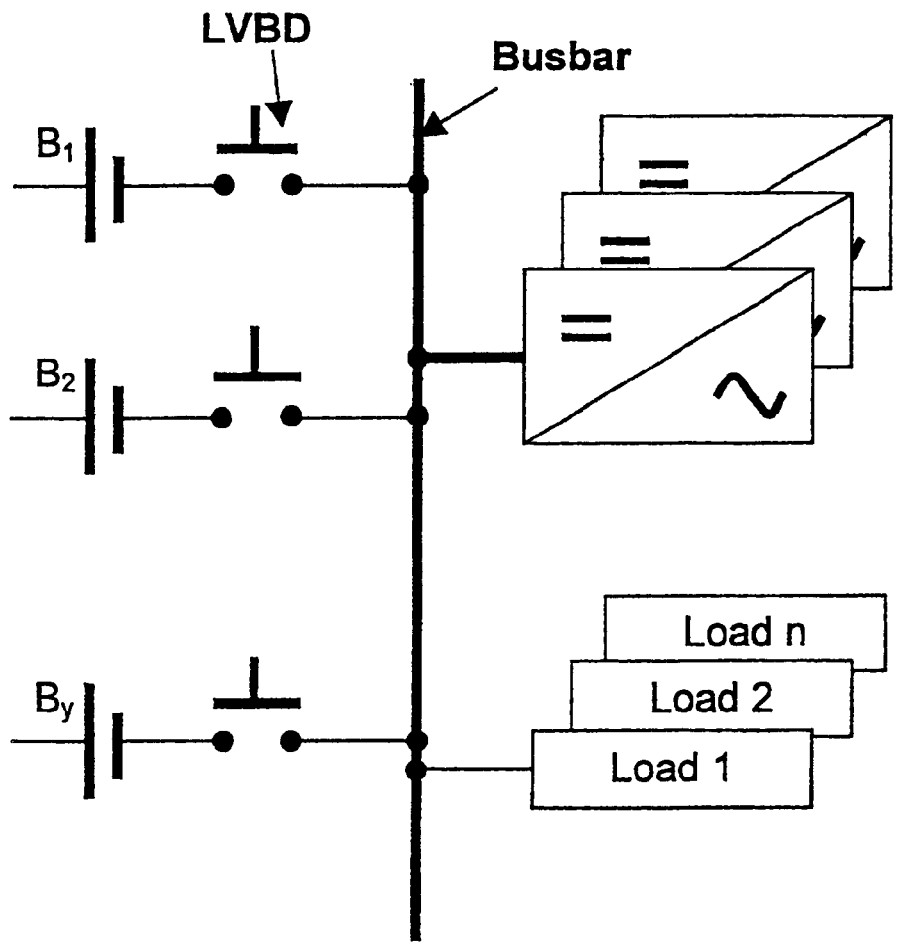
FIG. 1 demonstrates another typical arrangement according to the state of the art when having several distributed batteries and rectifiers.
Figure 2:
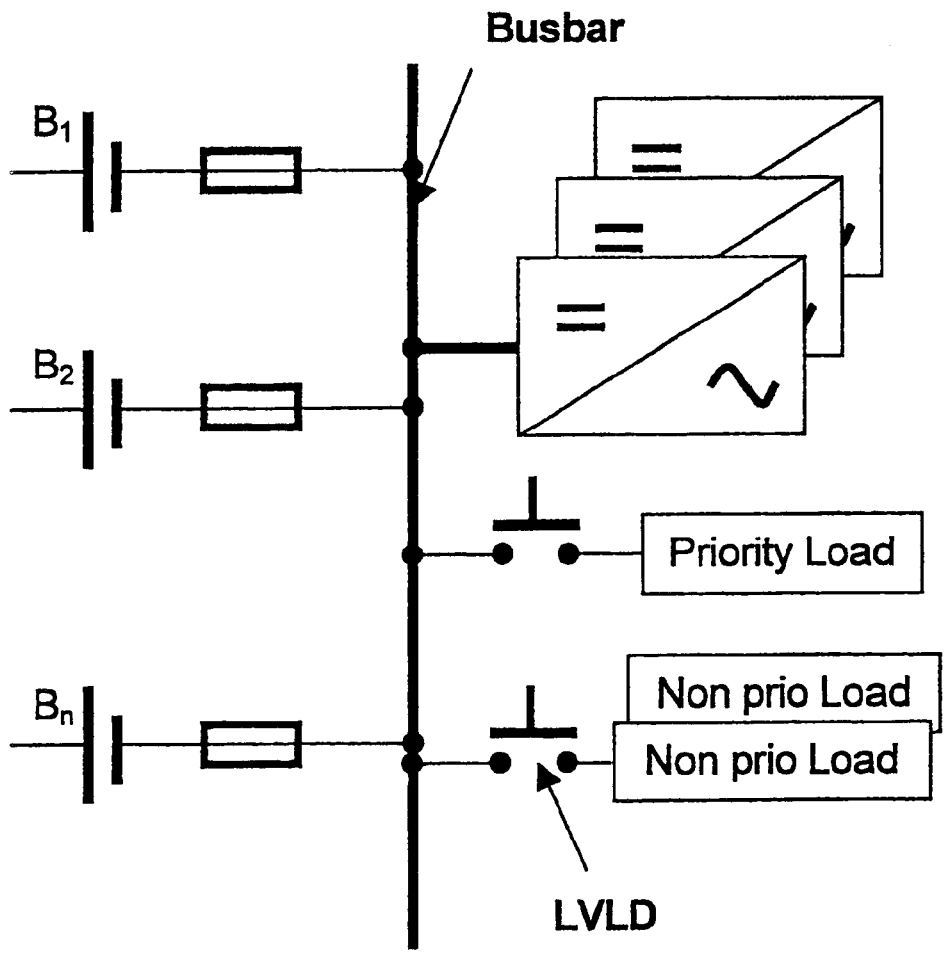
FIG. 2 demonstrates similar to FIG. 1 an arrangement but with a dividing of loads into groups of different priority when disconnecting loads.
Figure 3:
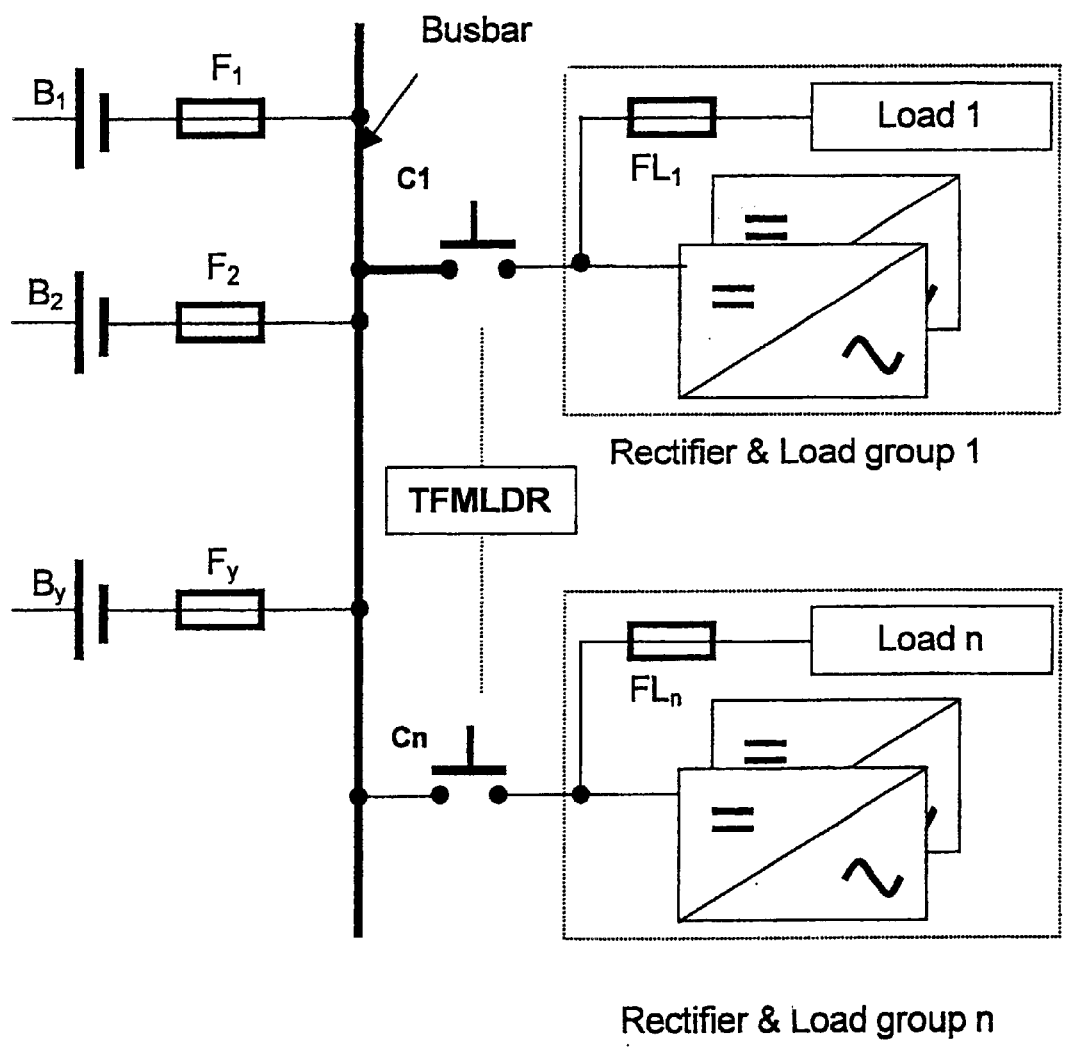
FIG. 3 illustrates a new way of arranging a system in accordance to the present invention.

FIG. 3 presents an illustrative embodiment of the present invention. In normal operation the disconnection/ reconnection devices $C_1$ to $C_n$ are closed, thus all units are connected in parallel (rectifiers, loads and batteries). A full float operation is easily achieved by using a pair of busbars to which the batteries $B_1$ to $B_y$ are connected. In FIG. 3 only the negative polarity busbar is indicated of the busbar pair. During a mains power failure, the loads will be supplied from the batteries $B_1$ to $B_y$ as the rectifier units in Rectifier & Load Groups 1 to n will no longer deliver any current. When defined disconnection conditions will be fulfilled for a load having the lowest priority load (these conditions may be different for different loads), its respective disconnection/connection member $C_x$ in the TFMLDR system will stop the battery power supply to that particular low priority circuit by disconnecting that low priority load from the busbar. In a preferred embodiment for further battery protection the batteries $B_1$ to $B_y$ will via a respective individual fuse $F_1$ to $F_y$, be connected to the pair of electrical power busbars supplying the loads 1 to n with power in absence of DC power from the rectifiers. Additionally the loads 1 to n, normally comprising several distributed load units, will be fed via respective fuses $FL_1$ to $FL_n$ by the number of rectifier units to obtain a mains power system redundancy, as easily recognized by a person skilled in the art, to guarantee a continuous operation of the load units in case of a single rectifier unit fault.

If the mains returns before any other load has been disconnected, the rectifier units belonging to the disconnected group will supply controlled (limited) current to the load of the disconnected group and thereby charge any input capacitance of the load to near the busbar voltage level, whereafter a transient free reconnection to the busbar will take place. When mains power returns the inrush current to the load disconnected from the busbar (and thereby from the backup batteries) will be limited by the rectifier current limiting function. Furthermore, this can then not affect other loads still connected to the busbar. The time for reconnecting the disconnected load group to the busbar by the TFMLDR system is typically controlled by a circuit comparing the voltage level at the input of the load and the battery voltage at the busbar. Such circuits are well known by persons skilled in the art and do not need any further discussion in this context.

At longer mains failures, loads with different priority will be disconnected in priority order: the lowest priority first, after that the second lowest priority and so on. When all loads have been disconnected from the busbar by the TFMLDR system the batteries are protected from deep discharge since current is no longer drawn from the batteries. Every load group 1 to n is provided with enough rectifier capacity to increase its input voltage, i.e. on the input capacitance, to the voltage level of the busbar. This controlled increase is the prerequisite for a transient free reconnection to the busbar. At the return of mains power, the respective group rectifiers, independent of the number of disconnected groups, will increase input voltage level of the group, as already described, to assure a transient free reconnection of the respective load group to the busbar.

Advantages of the improved system are that in every case of group reconnection this will not stress the contacts of the disconnection/reconnection devices. Furthermore the reconnection of whichever load does not cause transients of the system voltage, and does not disturb the operation of other connected loads.

During normal operating the disconnection/reconnection devices will carry a very low current (i.e. only the charging current to the batteries). Therefore loads can be disconnected/reconnected for maintenance reasons without jeopardizing the system operation. Also, the devices can even be used in a higher temperature environment.

Better availability is achieved compared to LVLD systems. In case of a disconnection/reconnection device failure the system according to FIG. 3 will still supply power to the load via the rectifiers. A mains power failure is needed to cause a loss of power supply to the load in question. As both batteries and rectifiers/loads are distributed evenly the system may theoretically be expanded with an unlimited number of distributed batteries and distributed groups of rectifiers/loads.

It will be understood by those skilled in the art that various modifications and changes may be made to the present invention without departure from the scope thereof, which is defined by the appended claims.

What is claimed is:

1. A system for reconnection of a load after a disconnection due to a mains power failure, the system comprising at least one rectifier, at least one battery and at least one load, characterized in that the at least one load is directly connected to the at least one rectifier delivering current controlled DC power during normal mains operation;

the at least one battery is via a power switching member ($C_1$–$C_n$) connected directly to a group (1-n) containing at least one load and at least one rectifier, whereby after a disconnection of the at least one battery ($B_1$–$B_y$) by the power switching member, a reconnect will not occur until the at least one rectifier has delivered current controlled DC power which has driven an input of the at least one load of the group up to a voltage level close to the voltage of the at least one battery to thereby limit inrush current and obtain an almost transient-free reconnection of the load of the group to the at least one battery.

2. The system according to claim 1, characterized in that the at least one rectifier comprises several rectifier units, which via a respective fuse are connected in parallel to the at least one load in the group.

3. The system according to claim 2, characterized in that the at least one battery ($B_1$–$B_y$) via an individual fuse ($F_1$–$F_y$) is connected to a pair of electrical power busbars feeding the at least one load of a group (1-n) with power via the switching member ($C_1$–$C_n$) in absence of DC power from the at least one rectifier.

4. The system according to claim 3, characterized in that the at least one load in a group (1-n) comprises several distributed load units, each load group fed via a respective fuse ($FL_1$–$FL_n$) by a number of rectifier units to obtain a mains power system redundancy to guarantee a continuous operation of the load units in case of a single rectifier unit fault.

5. The system according to claim 1, characterized in that the at least one rectifier has a current limiting function.

6. The system according to claim 1, characterized in that the system is provided with a circuitry (TFMLDR) comparing input voltage of a disconnected load group with the voltage of its disconnected busbar before a transient free connection is to be performed.

7. The system according to claim 1, characterized in that the at least one load of a group (1-n) further constitutes a capacitive load presenting a substantial input capacitance assisting in stabilizing DC power supplied to the at least one load by the at least on rectifier, thereby further ensuring a transient-free reconnection.

8. A method for, after a power disconnect of a load, achieving a transient free reconnection in a system comprising at least one rectifier, at least one battery and at least one load, characterized by the steps of connecting the at least one rectifier directly to the at least one load forming a group, which via a connecting/disconnecting member is connected to the at least one battery;

providing the at least one rectifier as a current limited DC power supply for the at least one load in the group, and when connected to the at least one battery, the at least one rectifier also acting as a battery charger;

after a disconnect of the at least one load with the at least one rectifier in the group from the at least one battery, and followed by a return of mains power to the at least one rectifier of the disconnected group, comparing a voltage level provided by the at least one rectifier with a present voltage level of the at least one battery before reconnecting the group to the at least one battery; and reconnecting the at least one battery via the connecting/disconnecting member to the at least one load of the disconnected group when the voltage level provided by the at least one rectifier is of the same order as the voltage level of the at least one battery to thereby obtain a transient free reconnection.

9. The method according to claim 8, characterized by the further step of arranging the at least one load of a group to present a substantial input capacitance assisting in stabilizing DC power supplied to the at least one load to thereby further reduce any reconnection transients.

10. An arrangement suitable for connection to at least one rectifier, at least one battery and at least one load and in operation functional for achieving reconnection of a load after a disconnection due to a mains power failure of a power system, characterized in that the at least one load is directly connected to the at least one rectifier delivering current controlled DC power during normal mains operation;

the at least one battery is via a power switching member ($C_1$–$C_n$) connected directly to a group (1-n) containing at least one load and at least one rectifier, whereby after a disconnection of the at least one battery ($B_1$–$B_y$) by the power switching member, a reconnect will not occur until the at least. one rectifier has delivered current controlled DC power which has driven an input of the at least one load of the group up to a voltage level close to the voltage of the at least one battery to thereby limit inrush current and obtain an almost transient-free reconnection of the load of the group to the at least one battery.

11. The arrangement according to claim 10, characterized in that the at least one rectifier comprises several rectifier units, which via a respective fuse are connected in parallel to the at least one load in the group.

12. The arrangement according to claim 11, characterized in that the at least one battery ($B_1$–$B_y$) via an individual fuse ($F_1$–$F_y$) is connected to a pair of electrical power busbars feeding the at least one load of a group (1-n) with power via the switching member ($C_1$–$C_n$) in absence of DC power from the at least one rectifier.

13. The arrangement according to claim 12, characterized in that the at least one load in a group (1-n) comprises several distributed load units, each load group fed via a respective fuse ($FL_1$–$FL_n$) by a number of rectifier units to obtain a mains power system redundancy to guarantee a continuous operation of the load units in case of a single rectifier unit fault.

14. The arrangement according to claim 10, characterized in that the at least one rectifier has a current limiting function.

15. The arrangement according to claim 10, characterized in that the system is provided with a circuitry (TFMLDR) comparing input voltage of a disconnected load group with the voltage of its disconnected busbar before a transient free connection is to be performed.

16. The arrangement according to claim 10, characterized in that the at least one load of a group (1-n) further constitutes a capacitive load presenting a substantial input capacitance assisting in stabilizing DC power supplied to the at least one load by the at least on rectifier, thereby further ensuring a transient-free reconnection.

* * * * *

UNITED STATES PATENT AND TRADEMARK OFFICE
CERTIFICATE OF CORRECTION

PATENT NO. : 6,531,791 B2  Page 1 of 1
DATED : March 11, 2003
INVENTOR(S) : Folke Ekelund et al.

It is certified that error appears in the above-identified patent and that said Letters Patent is hereby corrected as shown below:

<u>Title page,</u>
Item [57], ABSTRACT,
Line 7, "$(F_1\ 14\ F_y)$" should be -- $(F_1 - F_y)$ --.

<u>Column 4,</u>
Line 64, "on" should be -- one --.

<u>Column 6,</u>
Line 38, "on" should be -- one --.

Signed and Sealed this

Twenty-sixth Day of August, 2003

JAMES E. ROGAN
*Director of the United States Patent and Trademark Office*